(12) United States Patent
Muroi

(10) Patent No.: US 9,077,870 B2
(45) Date of Patent: Jul. 7, 2015

(54) COPY MACHINE WITH CONTROLLING OF PRINTING UNIT

(71) Applicant: Kazushige Muroi, Nagoya (JP)

(72) Inventor: Kazushige Muroi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/951,974

(22) Filed: Jul. 26, 2013

(65) Prior Publication Data

US 2014/0036289 A1  Feb. 6, 2014

(30) Foreign Application Priority Data

Aug. 2, 2012 (JP) ................................. 2012-171764

(51) Int. Cl.
| | |
|---|---|
| G06F 3/12 | (2006.01) |
| H04N 1/21 | (2006.01) |
| H04N 1/00 | (2006.01) |
| H04N 1/23 | (2006.01) |
| H04N 1/32 | (2006.01) |
| H04N 1/333 | (2006.01) |

(52) U.S. Cl.
CPC ............. *H04N 1/21* (2013.01); *H04N 1/00278* (2013.01); *H04N 1/0097* (2013.01); *H04N 2201/3298* (2013.01); *H04N 1/2369* (2013.01); *H04N 1/32443* (2013.01); *H04N 1/33307* (2013.01); *H04N 2201/33314* (2013.01); *H04N 2201/33357* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,491,557 A | 2/1996 | Nakajima et al. | |
| 2007/0292003 A1* | 12/2007 | Hirabayashi | 382/120 |
| 2012/0320398 A1* | 12/2012 | Katsuda et al. | 358/1.13 |

FOREIGN PATENT DOCUMENTS

| | | |
|---|---|---|
| JP | 05-183706 A | 7/1993 |
| JP | 2003-087467 A | 3/2003 |
| JP | 2010-034774 A | 2/2010 |

* cited by examiner

*Primary Examiner* — Benny Q Tieu
*Assistant Examiner* — Sunil Chacko
(74) *Attorney, Agent, or Firm* — Scully, Scott, Murphy & Presser, P.C.

(57) ABSTRACT

A copy machine includes a reading unit, memory and a printing unit. When reading and printing a document of a plurality of sheets, the copy machine performs: a preceding print mode for a former part of the document of the plurality of sheets, including storing an image data with a first compression ratio in the memory and starting printing of image of the former part of the document based on the stored image data before document reading of the reading unit is completed; and a memory print mode for a latter part of the document of the plurality of sheets, including storing the image data with a second compression ratio in the memory and starting printing of image of the latter part of the document based on the stored image data after the document reading of the reading unit is completed.

12 Claims, 8 Drawing Sheets

COPY MACHINE WITH CONTROLLING OF PRINTING UNIT

CROSS-REFERENCE TO RELATED APPLICATION

This application claims priority from Japanese Patent Application No. 2012-171764 filed on Aug. 2, 2012, the entire subject matter of which is incorporated herein by reference.

TECHNICAL FIELD

Illustrative aspects of the present invention relate to a copy machine configured to read a document and print a read image, more specifically, to a copy machine having a copy method that starts printing without waiting for completion of reading of a document and a copy method that starts printing after completion of reading of a document.

BACKGROUND

As a technology relative to copy machines, there has been proposed a copy method that starts printing without completion of reading of a document in order to reduce a time from start of the reading to completion of the printing. In this specification, this print mode to start printing without waiting for completion of reading of a document is referred to as a "preceding print mode". Meanwhile, the print mode to start printing after completion of reading of a document is referred to as a "memory print mode".

For example, there has been disclosed a technology of selecting a compression scheme according to the type of a copy command, compressing data of a read document according to the selected compression scheme, and determining a print start timing according to the compression scheme in a copy machine for performing print in a preceding print mode.

SUMMARY

Illustrative aspects of the present invention provide a copy machine capable of expecting to appropriately obtain advantages of both of a preceding print mode and a memory print mode.

According to one illustrative aspect of the present invention, there is provided a copy machine comprising: a reading unit configured to read a document; memory configured to store image data of the document read by the reading unit; a printing unit configured to print an image of the document read by the reading unit onto recording paper on a basis of the image data stored in the memory; and a processor. The memory is configured to store computer readable instructions that, when executed by the processor, cause the copy machine to: in a case of controlling the reading unit to read a document of a plurality of sheets and controlling the printing unit to print the document one at a time, perform a preceding print mode with respect to a former part of the document of the plurality of sheets and perform a memory print mode with respect to a latter part of the document of the plurality of sheets. The performing of the preceding print mode comprises: storing the image data with a first compression ratio in the memory; and starting printing of image of the former part of the document on the basis of the stored image data before document reading of the reading unit is completed. The performing of the memory print mode comprises: storing the image data with a second compression ratio, which is higher than the first compression ratio, in the memory; and starting printing of image of the latter part of the document on the basis of the stored image data after the document reading of the reading unit is completed.

DETAILED DESCRIPTION

General Overview

Figure 1:
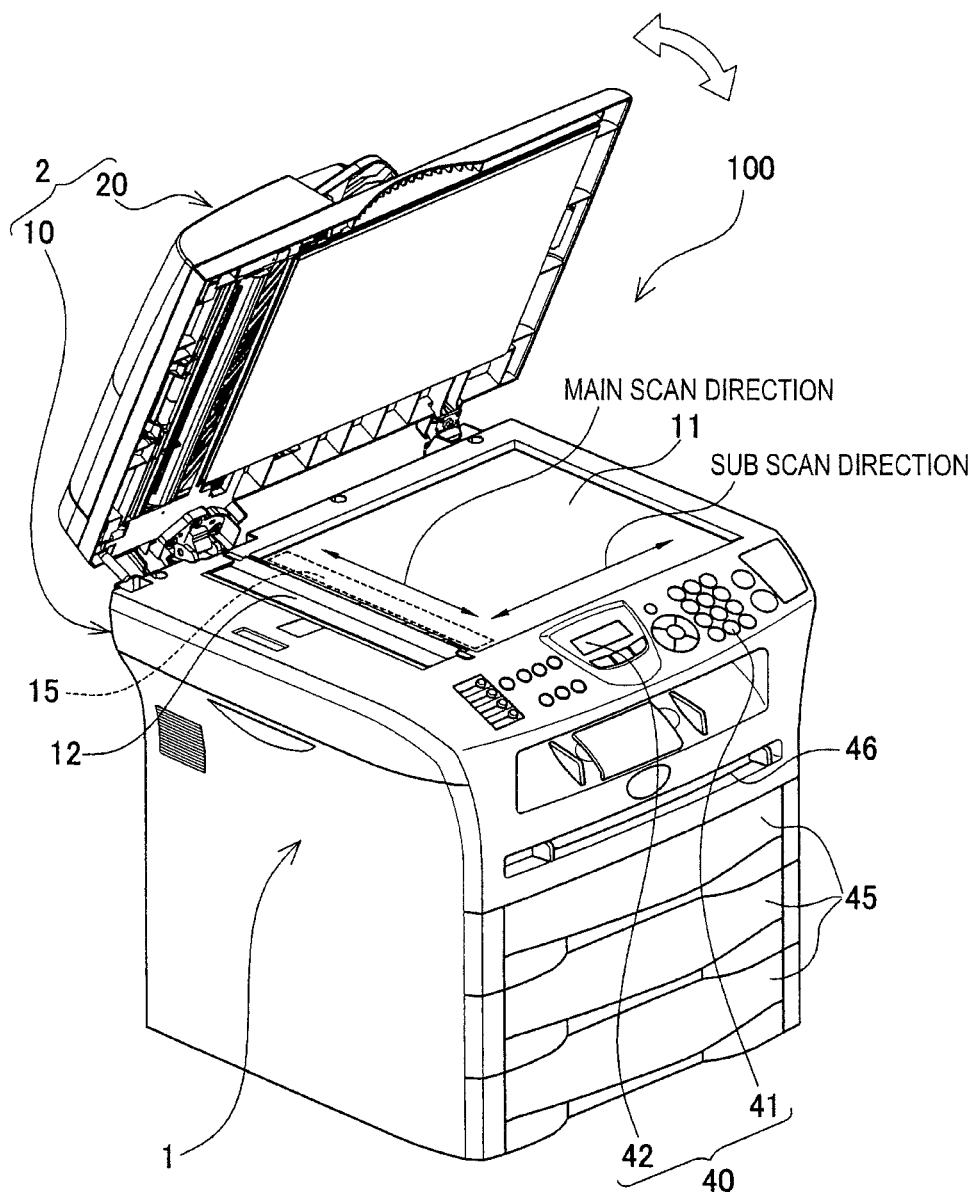
FIG. 1 is a perspective view illustrating an outer appearance of an MFP according to an exemplary embodiment.

The above-described related-art technology has some disadvantages. That is, in the printing according to the preceding print mode, there is an advantage of being able to early acquire a printed matter; however, since print starts before reading is completed, a risk of occurrence of defects such as data deficiency may be high. On the other hand, in the printing according to the memory print mode, contrary to the preceding print mode, it is impossible to early acquire a printed matter; however, a risk of defects that might occur in the preceding print mode is low. Like this, between the preceding print mode and the memory print mode, there is a trade-off in their advantages and disadvantages. Therefore, if only one print method is used, it is difficult to obtain the advantages of the other print method. Accordingly, there is room for improvement.

Therefore, illustrative aspects of the present invention provide a copy machine capable of expecting to appropriately obtain the advantages of both of the preceding print mode and the memory print mode.

According to a first illustrative aspect of the present invention, there is provided a copy machine comprising: a reading unit configured to read a document; memory configured to store image data of the document read by the reading unit; a printing unit configured to print an image of the document read by the reading unit onto recording paper on a basis of the image data stored in the memory; and a processor. The memory is configured to store computer readable instructions that, when executed by the processor, cause the copy machine to: in a case of controlling the reading unit to read a document of a plurality of sheets and controlling the printing unit to print the document one at a time, perform a preceding print mode with respect to a former part of the document of the plurality of sheets and perform a memory print mode with respect to a latter part of the document of the plurality of sheets. The performing of the preceding print mode comprises: storing the image data with a first compression ratio in the memory; and starting printing of image of the former part of the document on the basis of the stored image data before document reading of the reading unit is completed. The performing of the memory print mode comprises: storing the image data with a second compression ratio, which is higher than the first compression ratio, in the memory; and starting printing of image of the latter part of the document on the basis of the stored image data after the document reading of the reading unit is completed.

When copying a document of a plurality of sheets, the copy machine disclosed in this specification copies the former part of the document in the preceding print mode, and copies the latter part of the document in the memory print mode. With respect to the former part of the document of the plurality of sheets, it is user-friendly to be able to early acquire a printed matter. For example, a user can early confirm start of print and can also early confirm a print content, even if there is a mistake in setting a document or a mistake in setting print, it is possible to early instruct stop of print. For this reason, with respect to the former part of the document, the preceding print mode is appropriate.

On the other hand, with respect to the latter part of the document, since the necessity of early acquisition as described above is low, in order to reduce a risk of defects, it is preferable to copy the latter part in the memory print mode. Incidentally, a first compression ratio may be 0% (that is, non-compression). Further, a boundary between the former part of the document and the latter part of the document may be determined in units of one sheet of the document.

According to a second illustrative aspect of the present invention, in a case of confirming an event in which a free space of the memory becomes equal to or less than a threshold value while the reading unit reads a sheet of the document, the processor is configured to treat the remaining sheet of the document as the latter part of the document.

If a free space of the storing unit (a memory) becomes small, it may become difficult to store the image data of the document in the storing unit. Specifically, in the preceding print mode, due to a low compression ratio, it may be likely to become difficult to store image data having a large data size in the storing unit. Therefore, if the preceding print mode is maintained in a state where the free space of the storing unit is less than the threshold value, since a risk of defects is high, it is preferable to perform switching to the memory print mode.

According to a third illustrative aspect of the present invention, in a case of confirming an event of receiving another job while the reading unit reads a sheet of the document, the processor is configured to treat the remaining sheet of the document as the latter part of the document.

If another job is input, it may be necessary to store that job in the memory, and thus a load may be applied to the memory. Therefore, in a case of receiving another job, since the risk of defects is high, it is preferable to perform switching to the memory print mode. Incidentally, examples of another job include a fax print job, and a print job which is transmitted from another apparatus through a network.

According to a fourth illustrative aspect of the present invention, in a case of confirming an event in which a remaining amount of an expendable becomes equal to or less than a threshold value while the reading unit reads a sheet of the document, the processor is configured to treat the remaining sheet of the document as the latter part of the document.

In a case where the remaining amount of an expendable is small, it may be feared that the remaining amount of the expendable will be zero in the near future, and thus it will not be possible to continue print. If print becomes impossible, it is necessary to store image data of a read document in the memory, so that a load is applied to the memory. Therefore, in a case where the remaining amount of an expendable is equal to or less than the threshold value, it is preferable to perform switching to the memory print mode.

According to a fifth illustrative aspect of the present invention, in any one of the second to fourth illustrative aspects, in a case where the event has not been confirmed at a point of time when reading of a first sheet of the document starts, the processor is configured to treat the first sheet of the document as the former part of the document, and in a case where the event has been confirmed at the point of time when reading of the first sheet of the document starts, the processor is configured to treat the first document as the latter part of the document.

In a case where an event in which the preceding print mode is not preferable occurs from the beginning, it is possible to perform the memory print mode from the beginning.

According to a sixth illustrative aspect of the present invention, in a case where a sheet of the document is the N-th sheet, where N is an integer equal to or greater than 2, the processor is configured to treat the N-th and subsequent sheet of the document as the latter part of the document.

In this case, since the boundary between the former part of the document and the latter part of the document becomes a fixed value, control is simple. Incidentally, if the first sheet of a printed matter is output, the user can confirm that printed matter. That is, if N is 2, it is possible to reduce the risk of defects of the preceding print mode from the second sheet of the printed matter while it is possible to obtain the advantage of the preceding print mode with respect to the first sheet of the printed matter. Accordingly, it is possible to more appropriately obtain the advantages of both modes.

According to a seventh illustrative aspect of the present invention, in a case of confirming that a previous sheet of the document and the recording paper are not matched in size, the processor is configured to: treat the first sheet to the previous sheet of the document as the former part of the document; and treat the subsequent sheet of the document as the latter part of the document and perform magnification adjustment on the image data of the document in accordance with the size of the recording paper when performing the memory print mode for the subsequent sheet of the document.

In the preceding print mode, since there is a case where print starts in a state where the actual size of the document or an appropriate recording sheet size is unknown, there may be a possibility that a size mismatch between the document and a recording sheet will be occur. If the preceding print mode is continued with such a size mismatch, it may be feared that the number of print mistakes will increase and waste of expendables will increase. For this reason, it is preferable to perform switching to the memory print mode and match the sizes of the document and the recording sheet.

According to an eighth illustrative aspect of the present invention, the copy machine further comprises a plurality of sheet feeding units. In a case of confirming that a previous sheet of the document and the recording paper are not matched in size, the processor is configured to: treat the first sheet to the previous sheet of the document as the former part of the document; and treat the subsequent sheet of the document as the latter part of the document and switch the sheet feeding units in accordance with the size of the document when performing the memory print mode for the subsequent sheet of the document.

It is also possible to match the sizes of the document and the recording paper by performing switching between the sheet feeding units.

According to a ninth illustrative aspect of the present invention, the memory comprises a first memory configured to store the image data and a second memory configured to store the computer readable instructions.

According to the illustrative aspects the present invention, it is possible to implement a copy machine capable of expecting to obtain the advantages of both of the preceding print mode and the memory print mode.

Exemplary Embodiments

Exemplary embodiments of the present invention will be described in detail with reference to the accompanying drawings. The present exemplary embodiment is obtained by applying the present invention to a multi-function peripheral (MFP) having an image reading function and an image forming function.

[Configuration of MFP]

As shown in FIG. 1, an MFP 100 of the present exemplary embodiment includes an image forming unit 1 configured to print an image onto a sheet, and an image reading unit 2 configured to read an image of a document. The image forming unit 1 is an example of a printing unit. The image reading unit 2 is an example of a reading unit.

On the front surface side of the MFP 100, an operation panel 40 having a button group 41 and a display unit 42 are provided. The button group 41 is composed of various buttons such as a start key, a stop key, and a numeric keypad, and is configured to receive an input of a user. The display unit 42 is composed of, for example, a liquid crystal display, and is configured to display messages toward the user.

Further, at the lower portion of the image forming unit 1, a plurality of sheet trays 45 and a manual feed inlet 46 are provided. The sheet trays 45 are configured to store sheets for image formation. The image forming unit 1 is configured to determine one of the sheet trays 45 and the manual feed inlet 46 as a sheet feeding unit on a basis of, for example, an instruction of the user. Then, the image forming unit 1 is configured to feed the sheet one at a time from the determined sheet feeding unit, and form an image on the fed sheet.

The image forming unit 1 of the MFP 100 is a printer configured to form color images electro-photographically. Alternatively, the image forming unit 1 may be dedicated for monochrome images. The image forming unit 1 includes a photosensitive element and a process unit for forming a toner image on the photosensitive element. The image forming unit 1 is configured to transfer a toner image formed on the photosensitive element by the process unit, onto a sheet, and fix the toner image on the sheet, thereby obtaining an image.

Incidentally, the image forming unit 1 is a page printer for forming an image on a sheet one at a time. The image print of the image forming unit 1 is performed in units of one sheet of printing paper. Therefore, in the image forming unit 1, if a series of image forming operations starts, it is difficult to temporarily stop the series of image forming operations in the middle of it until an image forming process on one sheet is completed. Starting an image forming operation means to start a toner image forming operation while starting feed of a sheet to the process unit. Feed of a sheet to the process unit is specifically an operation of restarting rotation of a registration roller having been temporarily stopped.

Incidentally, although not shown in the drawings, in each sheet tray 45 of the image forming unit 1, a sheet detecting unit configured to detect existence or non-existence of a sheet is provided. Further, in the process unit of the image forming unit 1, a toner detecting unit configured to detect remaining amount of toner is provided. Therefore, in a case where a sheet tray 45 is out of paper, and in a case where a remaining amount of toner is equal to or less than a threshold value, the MFP 100 can recognize those situations.

[Configuration of Image Reading Unit]

As shown in FIG. 1, the image reading unit 2 is provided on the image forming unit 1 and includes a reading unit 10 and a document feeding unit 20. The reading unit 10 includes contact glass sheets 11 and 12 provided on its top, and an image sensor 15 provided below the contact glass sheets 11 and 12. The image sensor 15 includes optical devices arranged in a line in a main scan direction, and is provided to be movable in a sub scan direction.

The image reading unit 2 has a document-movement-based reading function and a device-movement-based reading function, as functions of reading images of documents. In a case of reading a document placed on the contact glass sheet 11, the image reading unit 2 reads an image of the document while moving the image sensor 15 in the sub scan direction. The function of reading a document while moving the image sensor 15 is the device-movement-based reading function. Hereinafter, a reading scheme using the device-movement-based reading function will be referred to as a flatbed (FB) scheme.

Meanwhile, in a case of reading a document placed on the document feeding unit 20, the image reading unit 2 moves the image sensor 15 to a position facing the contact glass sheet 12, and reads an image of the document while moving the document. The function of reading a document while moving the document, without moving the image sensor 15 during the reading of the document, is the document-movement-based reading function. Hereinafter, a reading scheme using the document-movement-based reading function will be referred to as an auto document feeder (ADF) scheme.

As shown in FIG. 1, the document feeding unit 20 is openable and closable. In an open state, the document feeding unit 20 is separated from the top surfaces of the contact glass sheets 11 and 12. In a closed state, the document feeding unit 20 covers the top surfaces of the contact glass sheets 11 and 12. Incidentally, FIG. 1 shows the open state of the document feeding unit 20. In a case of performing reading in the FB scheme, the user directly sets a document on the contact glass sheet 11. Then, the user closes the document feeding unit 20, thereby making the image reading unit 2 read the image of the document.

Figure 2:
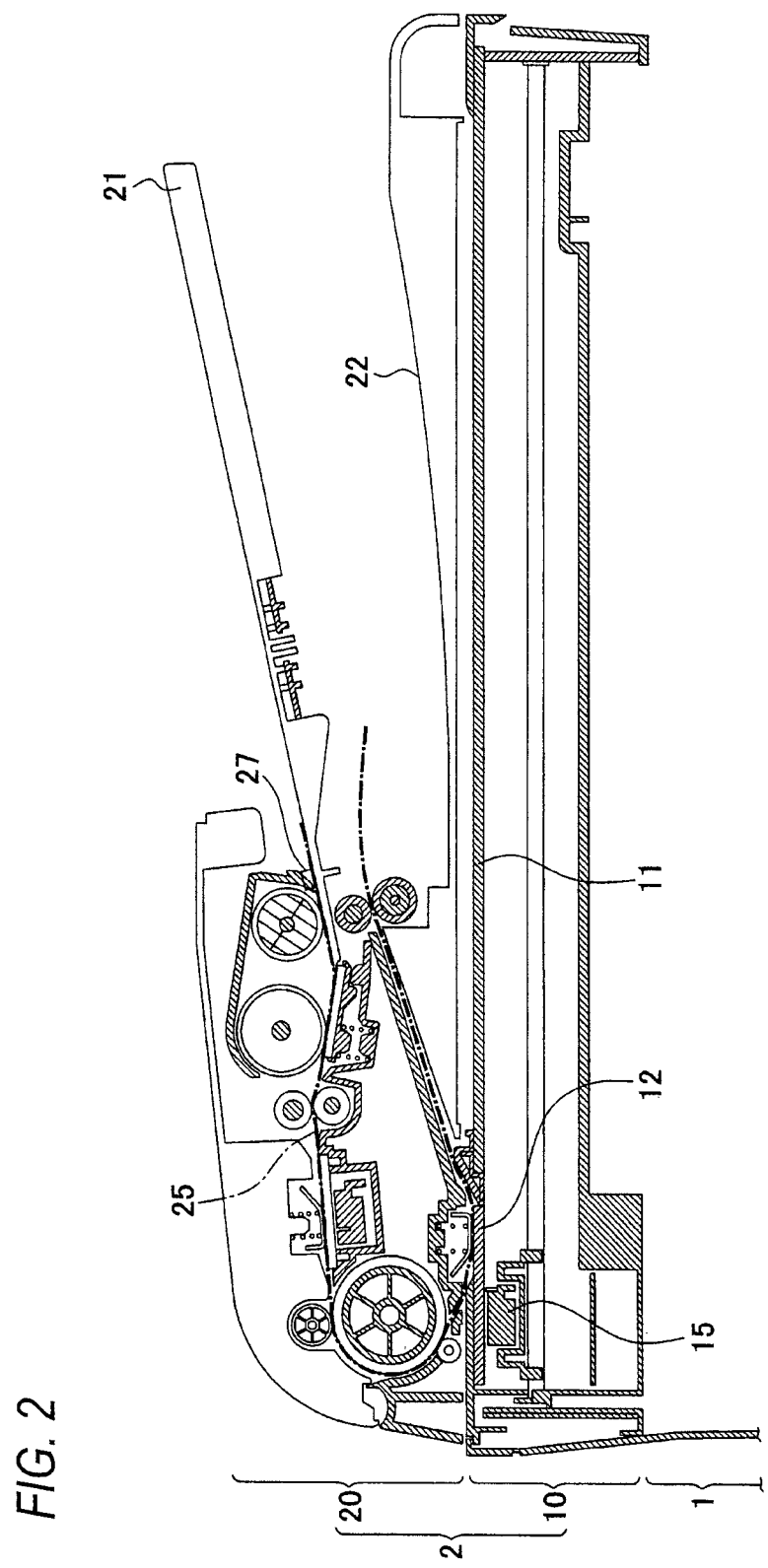
FIG. 2 is a cross-sectional view illustrating a document feeding unit.

The document feeding unit 20 includes a document placing tray 21 and a document discharge tray 22, as shown in FIG. 2. The document feeding unit 20 further includes a document feed path 25 provided as a document path from the document placing tray 21 to the document discharge tray 22.

In a case of performing reading in the ADF scheme, the user inserts a document to be copied into the document placing tray 21 of the document feeding unit 20. The document placing tray 21 can receive a document of a plurality of sheets in a stacked sate. In a case of reading a document set on the document feeding unit 20, the image reading unit 2 stops the image sensor 15 at a position facing the contact glass sheet 12. Then, the document feeding unit 20 feeds the document one at a time, such that the document passes above the image sensor 15 in the middle of the document feed path 25. After the document is positioned to face the image sensor 15, the document is further conveyed, and is discharged onto the document discharge tray 22.

The document placing tray 21 of the document feeding unit 20 includes a document detecting unit 27 configured to detect whether a document of one or more sheets is placed thereon. For example, the document detecting unit 27 is an optical sensor with a swingable piece provided at an entrance from the document placing tray 21 to the document feed path 25.

When the optical sensor detects that the swingable piece has swung to an extent, the MFP 100 determines that a document is placed on the document placing tray 21.

[Electric Configuration of MFP]

Figure 3:
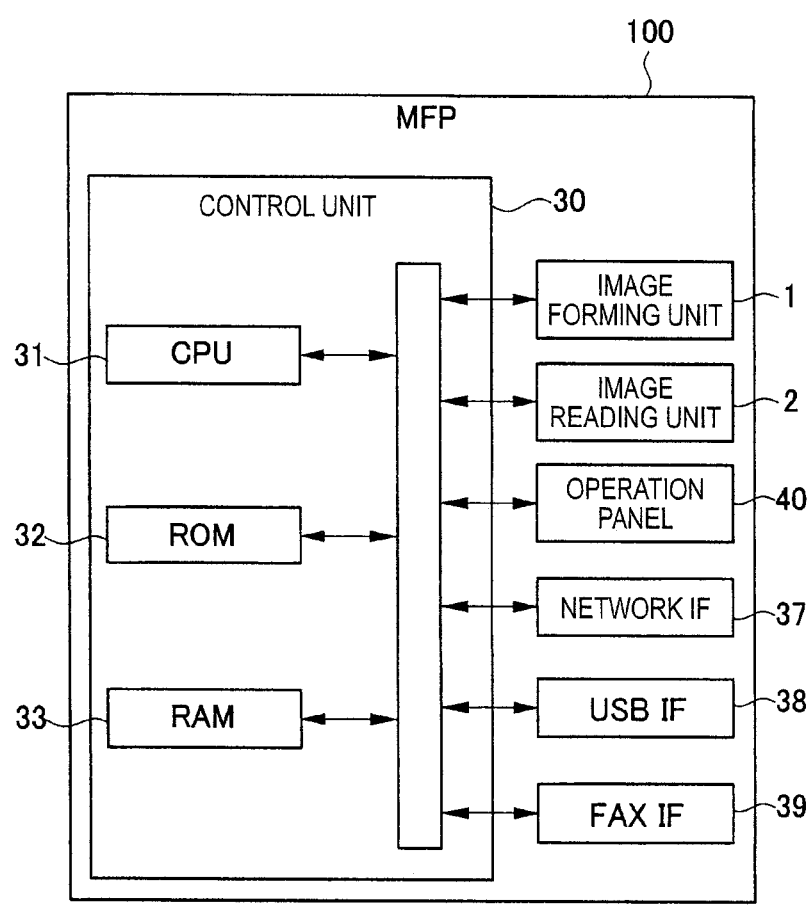
FIG. 3 is a block diagram illustrating an electric configuration of the MFP shown in FIG. 1.

Subsequently, the electric configuration of the MFP 100 will be described. As shown in FIG. 3, the MFP 100 includes a control unit 30 including a CPU 31, a ROM 32, and a RAM 33. The control unit 30 is electrically connected to the image forming unit 1, the image reading unit 2, the operation panel 40, a network interface 37, a USB interface 38, and a FAX interface 39.

The CPU 31 is configured to perform operations for implementing various functions such as an image reading function and an image forming function in the MFP 100, and becomes a core of the control. According to a control program read from the ROM 32, the CPU 31 controls individual components of the MFP 100 while storing the result of the process. The CPU 31 is an example of a control unit.

The ROM 32 stores various control programs for controlling the MFP 100, image processing programs, various option values, etc. The RAM 33 is used as a work space during execution of processes of various control programs and image processing programs. The RAM 33 is used as a storage area for temporarily storing image data of documents read by the image reading unit 2, and image data transmitted through various interfaces 37, 38, and 39.

The network interface 37 is connected to an information processing apparatus such as a computer. The USB interface 38 is connected to peripherals capable of USB connection, for example, USB memories. The FAX interface 39 is connected to a public telephone line. The MFP 100 is capable of data communication with external peripherals and the like through the network interface 37 or the USB interface 38. The MFP 100 is capable of transmission and reception of fax through the FAX interface 39.

Incidentally, the CPU 31 is able to detect the free space of the RAM 33. Further, the CPU 31 is able to detect the priorities of interrupt tasks. Still further, the CPU 31 is able to detect arrival of a signal to the FAX interface 39. Furthermore, the CPU 31 is able to detect a data reception amount per unit time.

[Modes of Copy Process]

Subsequently, a copy process of the MFP 100 will be described. The copy process is a process of the MFP 100 to make the image forming unit 1 form images using image data read by the image reading unit 2. Here, the copy process means a process of printing image data obtained by reading a document of one sheet onto one sheet, without processing the image data.

Figure 4:
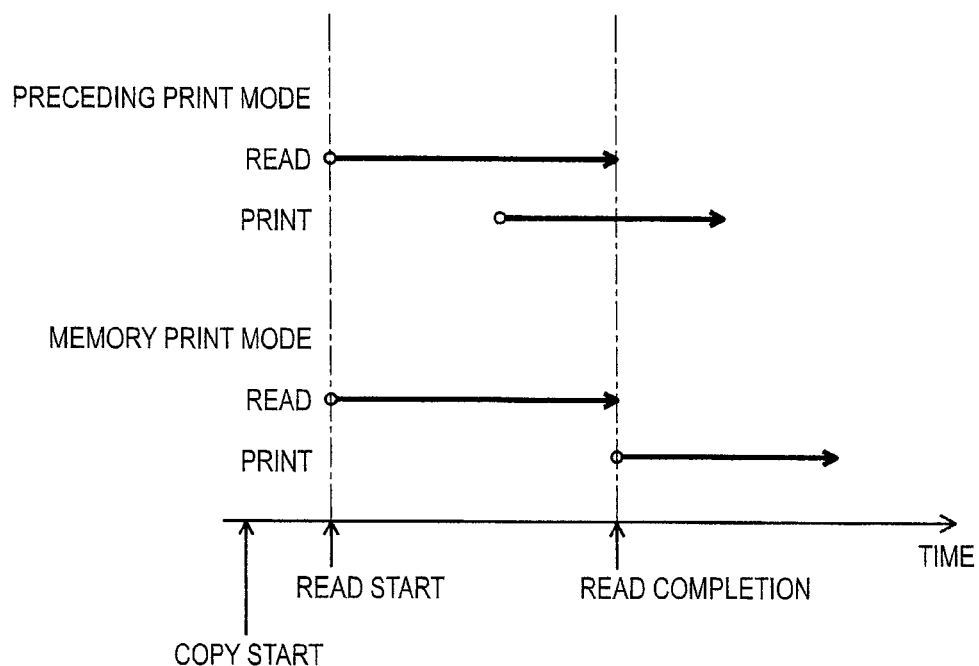
FIG. 4 is an explanatory view illustrating a timing difference between modes.

The MFP 100 has a preceding print mode and a memory print mode as modes for performing the copy process. The process timings in each mode are shown in FIG. 4. The preceding print mode is a mode to start image forming of the image forming unit 1 with respect to a document of one sheet, before the image reading unit 2 completes reading of the document. Meanwhile, the memory print mode is a mode to start image forming of the image forming unit 1 with respect to a document of one sheet after the image reading unit 2 completes reading of the document.

Incidentally, 'completion of reading of a document' means that the image reading unit 2 has read the above-described read range to the end. In the FB scheme, completion of reading of a document means that the image forming unit 1 has reached a position facing the end of the read range of the document. In the ADF scheme, completion of reading of a document means that the document has been conveyed to a position where the end of the read range of the document and the image sensor 15 face each other. Incidentally, in this specification, a process relative to image processing on image data obtained by the image reading unit 2 is not included in document reading.

Upon receiving a copy process instruction, the MFP 100 first controls the image reading unit 2 to start document reading. Then, the MFP 100 determines whether to execute the preceding print mode or the memory print mode until a print start timing in a case where the preceding print mode is selected. Next, the MFP 100 controls the image forming unit 1 to start printing at the print start timing in the selected mode. Incidentally, the MFP 100 determines a print operation start timing in the preceding print mode by back calculation from an estimated point of time when the image reading unit 2 completes the document reading.

As shown in FIG. 4, print in the preceding print mode starts before the image reading unit 2 completes the document reading, and is performed using image data of a read portion while the image reading unit 2 performs image reading. That is, in the preceding print mode, the image forming process of the image forming unit 1 starts before image data to be printed onto one sheet becomes complete.

Sheets for image forming of the image forming unit 1 need to be determined at least before start of the image forming operation. For this reason, in the preceding print mode, sheets for image forming are determined before document reading of the image reading unit 2 is completed. Further, as shown in FIG. 4, the completion of the preceding print mode is as early as the start thereof, as compared to the memory print mode. That is, the preceding print mode completes a printed matter within a shorter time from a copy start instruction, as compared to the memory print mode.

As described above, when the image forming process of the image forming unit 1 starts once, it is difficult to temporarily stop the image forming process in the middle of the process corresponding to one sheet. For this reason, in the preceding print mode, after a print operation starts, if an event in which a series of image reading processes of the image reading unit 2 is not ready in time for the progress of the image forming operation of the image forming unit 1 occurs, there is a possibility of a copy error such as data omission.

Meanwhile, in the memory print mode, if the image reading unit 2 completes reading of a document of one sheet such that image data for image forming onto one sheet becomes complete, print starts. Therefore, in the memory print mode, even if there is a defect in the reading, it is possible to suppress waste of expendables such as sheets and toner from increasing. Meanwhile, it takes a long time to be able to obtain a printed matter, as compared to the preceding print mode.

Incidentally, in the preceding print mode, the MFP 100 compresses read image data with a low compression ratio, and stores the compressed image data in the RAM 33. Alternatively, the MFP 100 may store the read image data in the RAM 33 without compression. However, due to the limitation of the capacity of the RAM 33, there may be a possibility that the MFP 100 is unable to store all image data of a document in the RAM 33. For this reason, the MFP 100 deletes image data sequentially from a portion having been read for an image forming process, and overwrites newly read image data.

In the memory print mode, the MFP 100 compresses read image data with a compression ratio higher than that in the preceding print mode, and stores the compressed image data in the RAM 33. Since the image data is compressed with a high compression ratio, the RAM 33 can store image data of at least one or more sheets of the document. For this reason, for example, in a case where various image processing is needed, or in a case where it is instructed to make two or more copies, the MFP 100 selects the memory print mode. In the memory print mode, the image forming unit 1 restores image data read from the RAM 33, and uses the restored image data.

[ADF Copy Process]

Subsequently, an ADF copy process will be described. The ADF copy process is a process of copying a document read in the ADF scheme. That is, the ADF copy process is a process of drawing a document one at a time from the document feeding unit 20, and making one copy with respect to each sheet of the document. When a document is placed on the document placing tray 21 of the document feeding unit 20 and a copy start button is pushed, the MFP 100 starts the ADF copy process.

The MFP 100 of the present exemplary embodiment has a function of properly using the preceding print mode and the memory print mode in the ADF copy process in a case where a document of a plurality of sheets is placed on the document placing tray 21. That is, the MFP 100 is able to copy the former part of the document of the plurality of sheets in the preceding print mode and to copy the latter part of the document in the memory print mode. Therefore, it is possible to obtain a copy of the former part of the document within a short time, and to appropriately obtain a copy of the latter part of the document.

Specifically, the MFP 100 starts to copy the document from the first sheet using the preceding print mode at first, and if a predetermined mode transition condition is satisfied, the MFP 100 transitions to the memory print mode. That is, with respect to the remaining sheets of the document, the MFP 100 continues copying using the memory print mode. The print mode is determined in units of one sheet of the document. Further, print mode transition is performed as much as once per one job.

Examples of Mode Transition Condition

First Exemplary Embodiment

Figure 5:
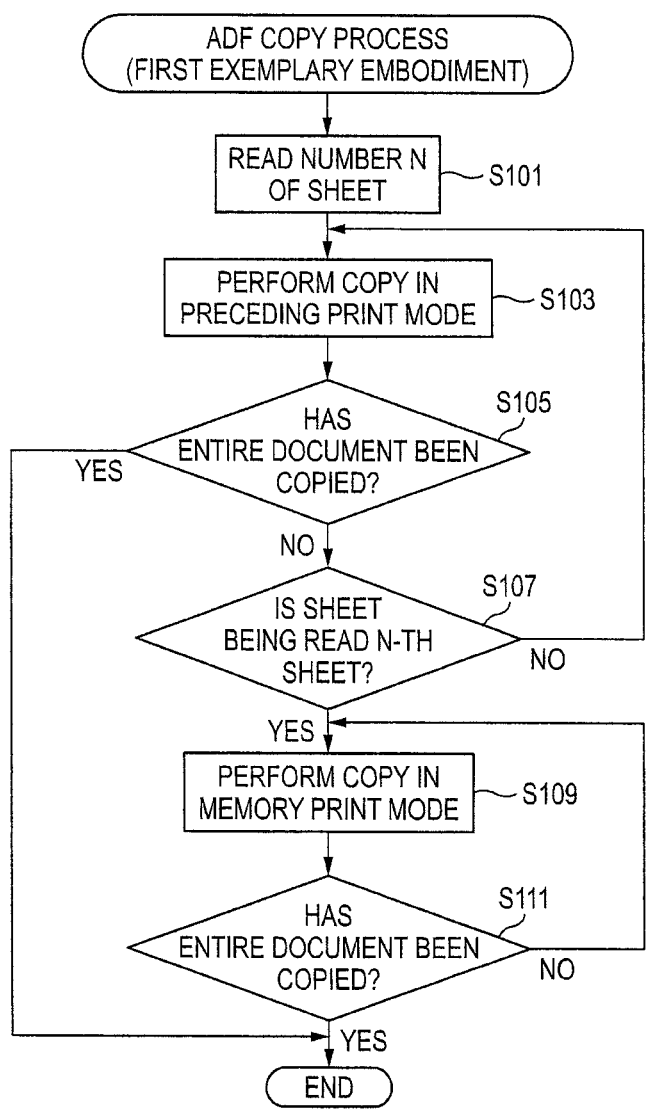
FIG. 5 is a flow chart illustrating an ADF copy process of a first exemplary embodiment.

Subsequently, an ADF copy process using a mode transition condition of a first exemplary embodiment will be described with reference to the flow chart of FIG. 5. The ADF copy process is performed by the CPU 31 in response to reception of an ADF copy instruction.

The mode transition condition of the first exemplary embodiment is a number N of sheets of a document. The number N of sheets of the document is determined according to the performance of the MFP 100 in advance before factory shipment, and is stored in the ROM 32. When the CPU 31 receives an ADF copy process instruction, in STEP S101, the CPU 31 reads the number N of sheets for transition to the memory print mode, from the ROM 32. The number N of sheets is an integer which is 2 or more, and is, for example, 2.

Next, in STEP S103, the CPU 31 controls to copy the first sheet of the document in the preceding print mode. That is, the CPU 31 controls to read the first sheet of the document while the first sheet is conveyed by the document feeding unit 20, and controls the image forming unit 1 to start printing of the image of the first sheet of the document before the reading is completed.

Subsequently, in STEP S105, the CPU 31 determines whether copy of the entire document has completed. If reading of one sheet of the document is completed, the document feeding unit 20 draws the next sheet of the document into the document feeding unit 20. In this case, if the document detecting unit 27 does not detect any document, that is, if the optical sensor of the document detecting unit 27 does not detect swinging of the swingable piece, the MFP 100 determines that there is no document placed on the document placing tray 21. In a case where there is no document to be drawn into the document feed path 25, the CPU 31 determines that reading of the entire document has completed. When copy of the entire document is completed (Yes in STEP S105), the CPU 31 completes the ADF copy process.

On the other hand, in a case where reading of the entire document has not completed (No in STEP S105), the CPU 31 controls the image reading unit 2 to read the next sheet of the document. Next, in STEP S107, the CPU 31 determines whether the sheet of the document being read is the N-th sheet of the document. In a case where the sheet of the document being read is not the N-th sheet (No in STEP S107), in STEP S103, the CPU 31 controls to continuously perform the copy in the preceding print mode. Then, until copy of the entire document is completed (Yes in STEP S105), or the sheet being read is the N-th sheet of the document (Yes in STEP S107), in STEP S103, the CPU 31 controls to perform the copy in the preceding print mode.

Then, if the N-th sheet of the document is read (Yes in STEP S107) before the copy of the entire document is completed (No in STEP S105), in STEP S109, the CPU 31 controls to copy the remaining sheets of the document in the memory print mode. That is, the CPU 31 is configured to compress read image data of the N-th and subsequent sheets of the document with the high compression ratio, store the compressed image data in the RAM 33, and control to start image forming of the image forming unit 1 when reading of the document is completed.

Subsequently, in STEP S111, the CPU 31 determines whether copy of the entire document has completed. If copy of the entire document has not completed (No in STEP S111), the CPU 31 controls to read the next sheet of the document and print the next sheet of the document in the memory print mode. Then, in STEP S109, the CPU 31 controls to copy all of the N-th and subsequent sheets of the document in the memory print mode. When the copy of the entire document is completed (Yes in STEP S111), the CPU 31 completes the ADF copy process.

As described above in detail, the MFP 100 of the first exemplary embodiment first copies the document from the first sheet in the preceding print mode. Next, the MFP 100 copies the N-th and subsequent sheets of the document in the memory print mode. That is, the former part of the document is the first to (N−1)-th sheets of the document and is composed of one or more sheets. The latter part of the document is from the N-th sheet of the document to the end of the document. In the present exemplary embodiment, since the boundary between the former part of the document and the latter part of the document is a fixed value, control is simple.

According to the above-described configuration, the MFP 100 of the present exemplary embodiment copies at least the first sheet of the document in the preceding print mode. Therefore, as compared to an apparatus which copies the entire document in the memory print mode, a time to obtain at least the printed matter of the first sheet is shorter. Therefore, since the user can early check the printed matter, for example, in a case where the obtained printed matter is different from the intention of the user, the user can early stop the print. Therefore, waste of expendables and a loss of time of the user can be reduced. Further, since the N-th and subsequent sheets are copied in the memory print mode, as compared to an apparatus which copies the entire document in the preceding print mode, a possibility that copies will be surely obtained to the end is high. Therefore, it is possible to expect to appropriately obtain the advantages of both of the preceding print mode and the memory print mode.

Specifically, if N is 2, only the first sheet of the document is printed in the preceding print mode. In the first sheet of the document, a risk of occurrence of defects such as data deficiency is low. Further, for the user, it is enough to be able to early check the printed matter of the first sheet. Since the second and subsequent sheets of the document are copied in the memory print mode, a risk of occurrence of defects is low.

Second Exemplary Embodiment

Next, an ADF copy process using a mode transition condition of a second exemplary embodiment will be described with reference to the flow charts of FIGS. 6 and 7.

In the second exemplary embodiment, the CPU 31 is configured to check the operation state of the MFP 100 and determine the mode transition condition according to the result of the checking. That is, in the present exemplary embodiment, unlike the first exemplary embodiment, what number of sheet of a document transition to the memory print mode is performed from is not determined in advance. There is a plurality of conditions of the operation state to be check, and only when determining that there is no difficulty in copy in the preceding print mode with respect to all conditions, the CPU 31 continuously performs copy in the preceding print mode.

When the ADF copy process starts to be performed, first, in STEP S201, the CPU 31 sets a state value to 0. The state value is, for example, a flag indicating the operation state of the MFP 100. The CPU 31 secures a storage area for storing the state value, for example, in the RAM 33. A state value "0" indicates that the operation state of the MFP 100 is a state in which a risk of occurrence of defects according to copy in the preceding print mode is low.

Next, in STEP S203, the CPU 31 performs a state check process. The state check process is a process in which the CPU 31 checks the operation state of each unit of the MFP 100 and sets the state value to 1 only when determining that an event in which it is preferable to transition to the memory print mode has been confirmed.

Here, the state check process (STEP S203 of FIG. 6) will be described with reference to the flow chart of FIG. 7. This flow chart illustrates examples (STEPS S301 to S306) of an event which it is preferable for the CPU 31 to check, of the operation state of each unit of the MFP 100.

First, in STEP S301, the CPU 31 determines whether the free space of the RAM 33 is sufficient. In the preceding print mode, image data is compressed with the low compression ratio and then is stored. Thus, if the free space of the RAM 33 is not sufficient, there is a possibility that errors will occur.

In a case where the CPU 31 determines that the free space of the RAM 33 is sufficient (No in STEP S301), subsequently, in STEP S302, the CPU 31 determines whether a fax is being received. When receiving fax data, the CPU 31 uses a large capacity of the RAM 33. For this reason, during fax reception, it is preferable to use the memory print mode.

If any fax is not being received (No in STEP S302), in STEP S303, the CPU 31 determines whether there is an interruption of a task having a priority higher than that of a scanner. Examples of a task having a priority higher than that of the scanner include an urgent print command from a PC. If a task with a high priority occupies the CPU 31, there is a possibility that reading of the image reading unit 2 may be intermittently performed, so that image data acquisition may not be performed in time for image forming of the image forming unit 1.

If there is no interruption of any task with a high priority (No in STEP S303), in STEP S304, the CPU 31 determines whether a data reception amount per time is large. For example, while a large amount of data is being received from an apparatus such as a peripheral connected to the MFP 100 by a cable, there is a possibility that the CPU 31 or the RAM 33 may be occupied.

In a case where the data reception amount is not large (No in STEP S304), in STEP S305, the CPU 31 determines where sheets have run out. The CPU 31 is able to determine whether sheets have run out, on the basis of detection results of sheet detecting units provided in the sheet trays 45. If sheets run out, print is impossible until sheets are replenished by the user. In the case where sheets have run out, the CPU 31 suspends the image forming process, and continuously performs only reading of the document.

In a case where sheets have not run out (No in STEP S305), in STEP S306, the CPU 31 determines whether toner has run out. On the basis of detection results of the toner detecting units provided in the process units, in a case where the storage amount of the toner for a developing process of the image forming unit 1 is smaller than a predetermined limit amount, the CPU 31 determines that the toner has run out. In a case of determining that appropriate print is not possible since the toner has run out, the CPU 31 suspends the image forming process, and continuously performs only reading of the document.

In a case where the toner has not run out (No in STEP S306), the CPU 31 completes the state check process without changing the state value. That is, in a case of determining that there is no problem, the CPU 31 returns to STEP S200 of FIG. 6 until the state value becomes 0.

If a corresponding event occurs in any one of STEPS S301 to S306, in STEP S308, the CPU 31 sets the state value to 1. Further, if the state value is 1, since it is unnecessary to check the other events, the CPU 31 completes the state check process, and returns to STEP S205 of FIG. 6.

For example, in a case where the free space of the RAM 33 is equal to or less than the predetermined threshold value (Yes in STEP S301), in STEP S308, the CPU 31 sets the state value to 1. If fax reception is being performed (Yes in STEP S302), in STEP S308, the CPU 31 sets the state value to 1. Further, in a case where there is interruption of a task having a high priority (Yes in STEP S303), in STEP S308, the CPU 31 sets the state value to 1. Still further, in a case where the data reception amount per time is large (Yes in STEP S304), in STEP S308, the CPU 31 sets the state value to 1. Still further, in a case where sheets have run out (Yes in STEP S305), in STEP S308, the CPU 31 sets the state value to 1. Still further, in the case where the toner has run out (Yes in STEP S306), in STEP S308, the CPU 31 sets the state value to 1.

Incidentally, it is not necessarily needed to perform the determinations of all of STEPS S301 to S306, and at least one determination may be performed. Further, the order of the determinations of STEPS S301 to S306 is not limited thereto. The CPU 31 may perform the determinations in any order, or may perform the plurality of determining processes in parallel. Besides those events, if there is any event which may interrupt continuance of copy in the preceding print mode, it is preferable that the CPU 31 should perform an additional determination.

Referring to FIG. 6 again, the ADF copy process will be described from STEP S205. After the state check process is completed, in STEP S205, the CPU 31 determines whether the state value is 0. If the state value is 0 (Yes in STEP S205), in STEP S207, the CPU 31 controls to copy the next one sheet of the document in the preceding print mode.

Next, in STEP S208, the CPU 31 determines whether copy of the entire document has completed. If copy of the entire document has completed (Yes in STEP S208), the CPU 31 completes the ADF copy process. If copy of the entire document has not completed (No in STEP S208), the CPU 31 returns to STEP S203 in which the CPU 31 performs the state check process.

On the other hand, in a case where the state value after the state check process is not 0 (No in STEP S205), the CPU 31 makes transition to the memory print mode be performed. Next, in STEP S210, the CPU 31 controls to copy the next one sheet of the document in the memory print mode. Then, in STEP S211, the CPU 31 determines whether copy of the entire document has completed. If copy of the entire document has completed (Yes in STEP S211), the CPU 31 completes the ADF copy process.

If the copy of the entire document has not completed (No in STEP S211), in STEP S210, the CPU 31 controls to copy the next sheet of the document in the memory print mode. If transition to the memory print mode is performed once, transition to the preceding print mode is not performed. Therefore, after transition to the memory print mode, the CPU 31 controls to copy all of the remaining sheets of the document in the memory print mode, without performing the state check process. When the copy of the entire document is completed (Yes in STEP S211), the CPU 31 completes the ADF copy process.

As described above in detail, according to the MFP 100 of the second exemplary embodiment, the operation state is checked whenever one sheet of the document is copied, and the boundary between the former part and latter part of the document is determined in view of various operation states. Further, the former part of the document is copied in the preceding print mode, and the latter part of the document is copied in the memory print mode. That is, if a predetermined condition in which a risk of defects according to copy in the preceding print mode will increase is satisfied, the remaining document is copied in the memory print mode. Therefore, like the first exemplary embodiment, it is possible to expect to appropriately obtain the advantages of both of the preceding print mode and the memory print mode.

Incidentally, in the present exemplary embodiment, the CPU 31 performs the state check process before copy of the first sheet. That is, in a case where a predetermined condition is satisfied from the beginning, the MFP 100 copies the document from the first sheet in the memory print mode. In a case where an event in which a risk of defects will increase if copy is performed in the preceding print mode is confirmed from the beginning, exceptionally, it is preferable to perform copy in the memory print mode from the first sheet.

Third Exemplary Embodiment

Figure 7:
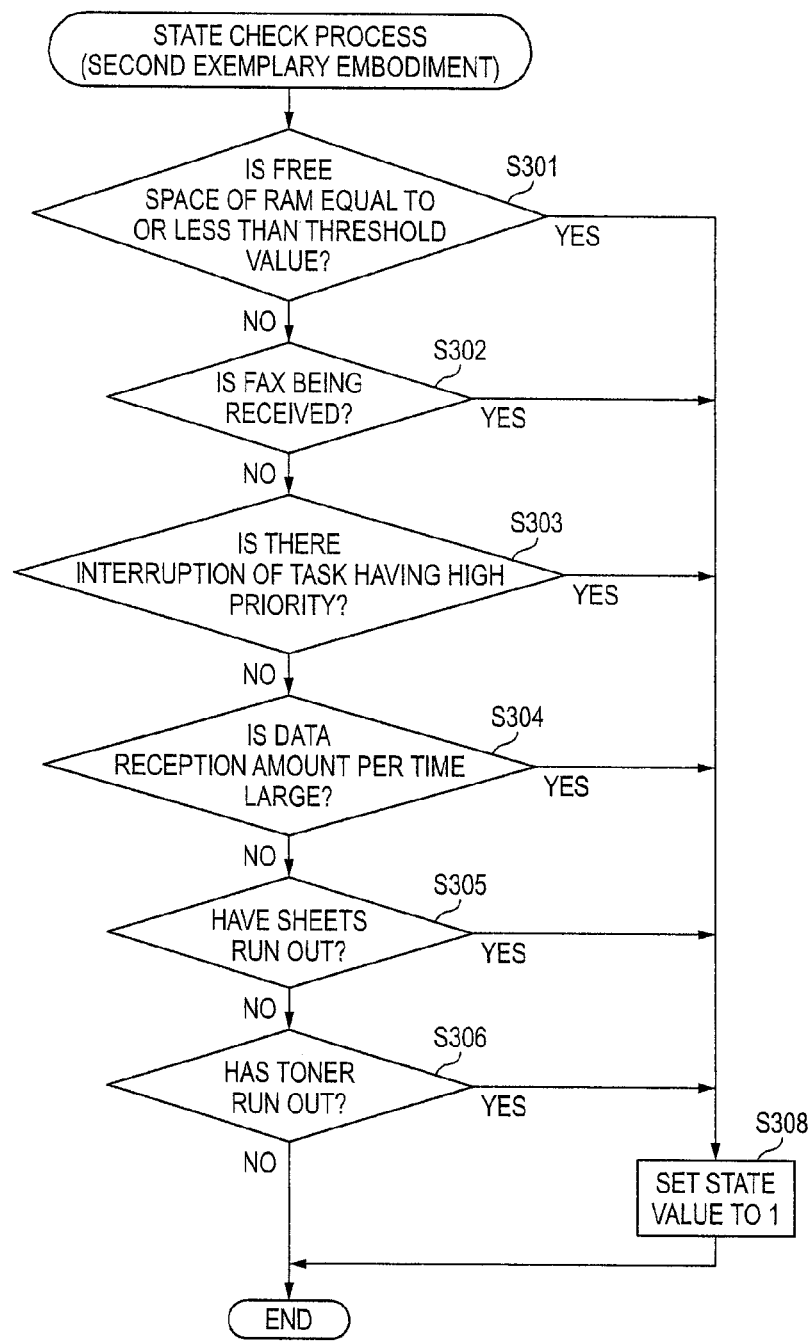
FIG. 7 is a flow chart illustrating a state check process of the ADF copy process of the second exemplary embodiment.
Figure 8:
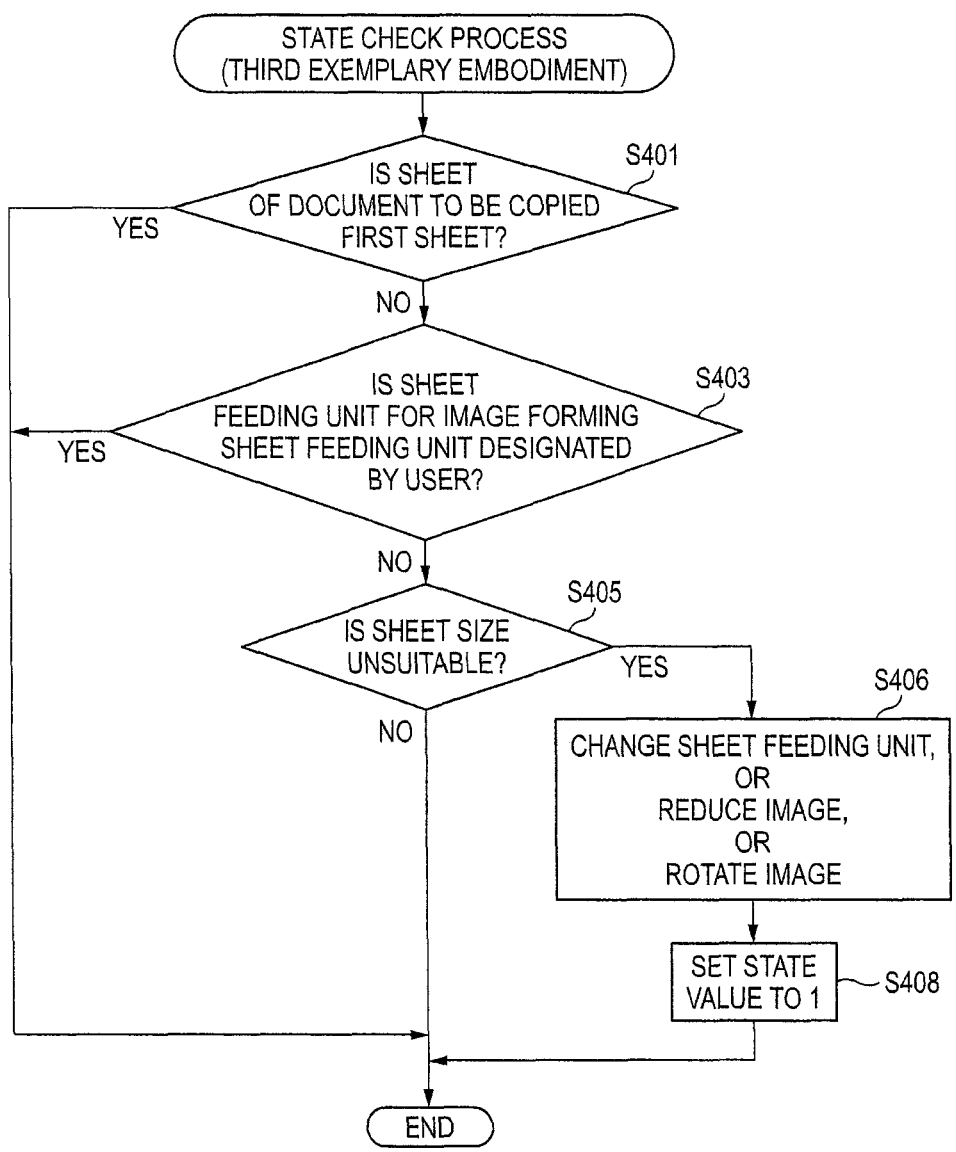
FIG. 8 is a flow chart illustrating a state check process of an ADF copy process of a third exemplary embodiment.

Next, an ADF copy process using a mode transition condition of a third exemplary embodiment will be described with reference to the flow chart of FIG. 8. The third exemplary embodiment is an ADF copy process obtained by changing the state check process (shown in FIG. 7) of the second exemplary embodiment to the process of FIG. 8. A main portion of the ADF copy process of the third exemplary embodiment is substantially the same as those of the second exemplary embodiment shown in FIG. 6, and thus description thereof will be omitted.

If the state check process of the third exemplary embodiment starts, first, in STEP S401, the CPU 31 determines whether a sheet to be copied is the first sheet of the document. The state check process of the present exemplary embodiment is skipped for copy of the first sheet of the document. Therefore, if the sheet to be copied is the first sheet of the document (Yes in STEP S401), the CPU 31 completes the state check process, and returns to STEP 205 of the mode transition process of FIG. 6.

If the sheet to be copied is not the first sheet of the document (No in STEP S401), in STEP S403, the CPU 31 determines whether a sheet feeding unit to be used by the image forming unit 1 is a sheet feeding unit designated by the user. In the preceding print mode, the CPU 31 controls to start image forming of the image foaming unit 1 before document image reading of the image reading unit 2 completes. For this reason, a sheet feeding unit to feed sheets for print is determined in advance from among the sheet trays 45 and the manual feed inlet 46, regardless of the size of the document.

For example, the sheet feeding unit may be determined by an instruction of the user. Meanwhile, in a case where the sheet feeding unit is not determined by an instruction of the user, the CPU 31 determines the sheet feeding unit to a predetermined prior sheet feeding unit or a sheet feeding unit having a high frequency of use. In a case where the sheet feeding unit is determined by designation of the user (Yes in STEP S403), since it is unnecessary to determine sheet suitability, the CPU 31 completes the state check process, and returns to STEP 205 of the mode transition process of FIG. 6.

In a case where the sheet feeding unit is not determined by designation of the user (No in STEP S403), in STEP S405, the CPU 31 checks the suitability of the size of the document image read in the previous copy by the image reading unit 2 and the size of a sheet fed to the image forming unit 1.

For example, in a case where the document image is larger than the fed sheet such that the entire image is not fit in the sheet, the CPU 31 determines that the sheet size is unsuitable. Even if the document and the sheet are the same in size, if their vertical and horizontal directions are different, the CPU 31 determines that the sheet size is unsuitable. Further, even in a case where the size of the fed sheet is excessively larger than the size of the document, the CPU 31 determines that the sheet size is unsuitable.

In a case of determining that the size of the sheet fed from the determined sheet feeding unit and the document image size are unsuitable as a result of copy in the preceding print mode (Yes in STEP S405), the CPU 31 changes the sheet size or the size of the image data. For example, in a case where there is a sheet feeding unit storing more appropriate sheets, in STEP S406, the CPU 31 changes the sheet feeding unit to feed sheets in the subsequent copy. Alternatively, in STEP S406, the CPU 31 reduces or rotates the image read from the document, thereby generating image data suitable for the sheet size.

Next, in STEP S408, the CPU 31 sets the state value to 1. That is, in a case where the CPU 31 determines that the sheet size is unsuitable, the CPU 31 determines that a risk of occurrence of defects according to copy in the preceding print mode is high. If setting the state value to 1, the CPU 31 completes the state check process, and proceeds to STEP S205 of the mode transition process of FIG. 6.

Figure 6:
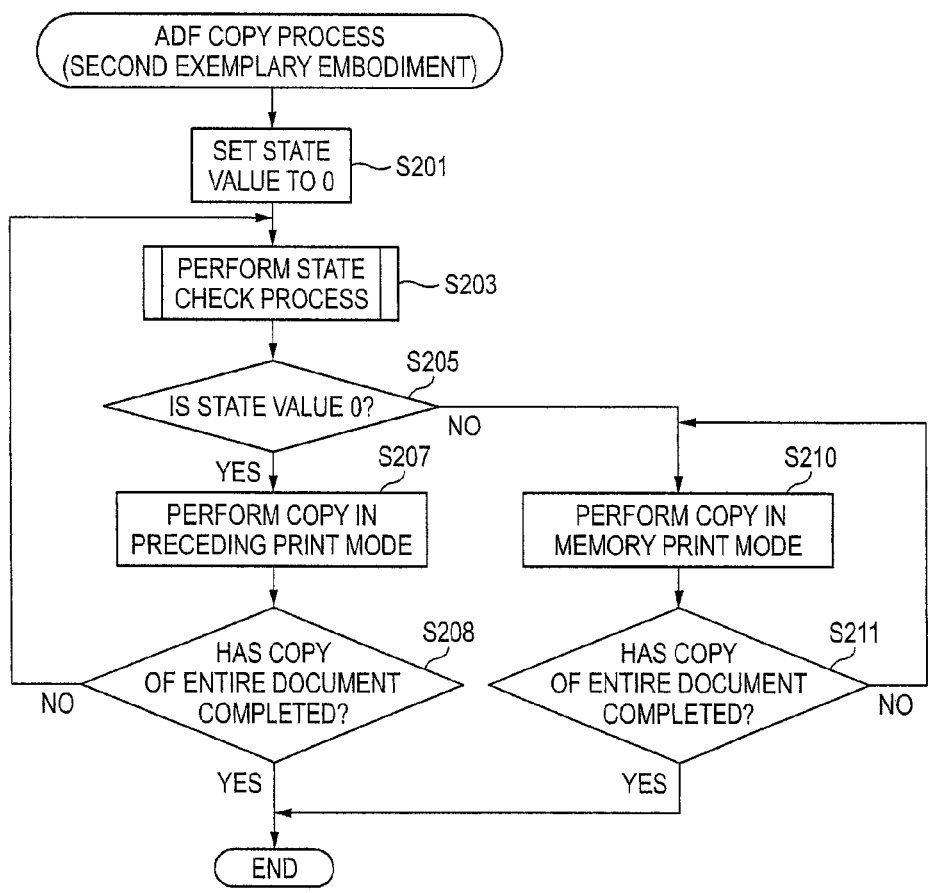
FIG. 6 is a flow chart illustrating an ADF copy process of a second exemplary embodiment.

In a case of determining that the document size and the sheet size are suitable (No in STEP S405), the CPU 31 proceeds to STEP S205 of the mode transition process of FIG. 6, without changing the state value.

As described above in detail, according to the MFP 100 of the third exemplary embodiment, it is checked whether the sheet size was suitable by making use of the previous copy result. In a case where the sheet has been designated by the user, or the sheet and the document are suitable, since a risk of defects according to copy in the preceding print mode is not high, the CPU 31 continues copy in the preceding print mode. Meanwhile, if the sheet size is unsuitable, the CPU 31 changes the sheet size or the image size, and performs the subsequent copy in the memory print mode. This prevents a continuation of the copy with the sheet size being unsuitable, and thus waste of expendables is suppressed. Therefore, like the first exemplary embodiment, it is possible to expect to appropriately obtain the advantages of both of the preceding print mode and the memory print mode.

Incidentally, it is more preferable to perform both of the state check process of the present exemplary embodiment and the state check process of the second exemplary embodiment. Further, the state check process of the present exemplary embodiment may be performed only with respect to the result of copy of the first sheet.

Incidentally, the above-described exemplary embodiments are merely illustrative, and do not limit the present invention at all. Therefore, naturally, the present invention can be variously modified or changed without departing from the scope of the present invention. For example, the present invention is not limited to the MFP, but can be applied to any apparatuses having a copy function, such as copy machines and facsimiles.

For example, in the above-described exemplary embodiments, a sheet detecting unit is provided for each sheet tray 45, and a toner detecting unit is provided for the process unit. However, the sheet detecting unit and the toner detecting unit may be omitted. For example, if sheet feeding from a sheet tray 45 has failed during the previous print, the CPU 31 may determine that there is no sheet. Further, the CPU 31 may estimate the consumption of the toner on the basis of the number of revolutions of a developing roller or a print dot count, and determine lack of the remaining amount of the toner. Further, even if sheets a sheet tray 45 being used run out, if sheet feeding from another sheet tray 45 is possible, the CPU 31 may determine that the sheets have not run out. Furthermore, the case where the CPU 31 determines that the sheets have run out or the toner has run out is not limited to the case where the remaining amount is zero, but may include a case where any one remaining amount is small.

The processes disclosed in the exemplary embodiments may be performed by a single CPU, a plurality of CPUs, hardware such as an ASIC, or a combination of them. Further, the processes disclosed in the exemplary embodiments may be implemented in various forms such as recording media having programs for executing those processes, or methods of performing those processes.

What is claimed is:

1. A copy machine comprising:
a reading unit configured to read a document;
memory configured to store image data of the document read by the reading unit;
a printing unit configured to print an image of the document read by the reading unit onto recording paper on a basis of the image data stored in the memory; and
a processor,
wherein the memory is configured to store computer readable instructions that, when executed by the processor, cause the copy machine to:
in a case of controlling the reading unit to read a document of a plurality of sheets and controlling the printing unit to print the document one at a time,
perform a former part printing with respect to a former part of the document of the plurality of sheets in a preceding print mode, the preceding print mode comprising:
starting printing of image of the former part of the document on the basis of the stored image data before document reading of the reading unit is completed; and perform a latter part printing with respect to a latter part of the document of the plurality of sheets in a memory print mode, the memory print mode comprising:
starting printing of image of the latter part of the document on the basis of the stored image data after the document reading of the reading unit is completed.

2. The copy machine according to claim 1,
wherein in a case of confirming an event in which a free space of the memory becomes equal to or less than a threshold value while the reading unit reads a sheet of the document, the processor is configured to treat the remaining sheet of the document as the latter part of the document.

3. The copy machine according to claim 2,
wherein in a case where the event has not been confirmed at a point of time when reading of a first sheet of the document starts, the processor is configured to treat the first sheet of the document as the former part of the document, and
wherein in a case where the event has been confirmed at the point of time when reading of the first sheet of the document starts, the processor is configured to treat the first document as the latter part of the document.

4. The copy machine according to claim 1,
wherein in a case of confirming an event of receiving another job while the reading unit reads a sheet of the document, the processor is configured to treat the remaining sheet of the document as the latter part of the document.

5. The copy machine according to claim 4,
wherein in a case where the event has not been confirmed at a point of time when reading of a first sheet of the document starts, the processor is configured to treat the first sheet of the document as the former part of the document, and
wherein in a case where the event has been confirmed at the point of time when reading of the first sheet of the document starts, the processor is configured to treat the first document as the latter part of the document.

6. The copy machine according to claim 1,
wherein in a case of confirming an event in which a remaining amount of an expendable becomes equal to or less than a threshold value while the reading unit reads a sheet of the document, the processor is configured to treat the remaining sheet of the document as the latter part of the document.

7. The copy machine according to claim 6,
wherein in a case where the event has not been confirmed at a point of time when reading of a first sheet of the document starts, the processor is configured to treat the first sheet of the document as the former part of the document, and
wherein in a case where the event has been confirmed at the point of time when reading of the first sheet of the document starts, the processor is configured to treat the first document as the latter part of the document.

8. The copy machine according to claim 1,
wherein in a case where a sheet of the document is the N-th sheet, where N is an integer equal to or greater than 2, the processor is configured to treat the N-th and subsequent sheet of the document as the latter part of the document.

9. The copy machine according to claim 1,
wherein in a case of confirming that a previous sheet of the document and the recording paper are not matched in size, the processor is configured to:
treat the first sheet to the previous sheet of the document as the former part of the document; and treat the subsequent sheet of the document as the latter part of the document and perform magnification adjustment on the image data of the document in accordance with the size of the recording paper when performing the memory print mode for the subsequent sheet of the document.

10. The copy machine according to claim 1, further comprising a plurality of sheet feeding units,
wherein in a case of confirming that a previous sheet of the document and the recording paper are not matched in size, the processor is configured to:
treat the first sheet to the previous sheet of the document as the former part of the document; and
treat the subsequent sheet of the document as the latter part of the document and switch the sheet feeding units in accordance with the size of the document when performing the memory print mode for the subsequent sheet of the document.

11. The copy machine according to claim 1, wherein the memory comprises a first memory configured to store the image data and a second memory configured to store the computer readable instructions.

12. The copy machine according to claim 1,
wherein the preceding print mode further comprises storing the image data with a first compression ratio in the memory, and
wherein the memory print mode further comprises storing the image data with a second compression ratio, which is higher than the first compression ratio, in the memory.

* * * * *